(12) United States Patent  
Gao et al.

(10) Patent No.: US 8,719,732 B2  
(45) Date of Patent: May 6, 2014

(54) METHOD AND SYSTEM FOR APPLYING 3D SWITCH PANEL IN INSTANT MESSAGING TOOL

(71) Applicant: Tencent Technology (Shenzhen) Company Limited, Shenzhen (CN)

(72) Inventors: Shundong Gao, Shenzhen (CN); Weiwen Xie, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 13/708,545

(22) Filed: Dec. 7, 2012

(65) Prior Publication Data

US 2013/0125048 A1 May 16, 2013

Related U.S. Application Data

(63) Continuation of application No. PCT/CN2011/071234, filed on Feb. 24, 2011.

(30) Foreign Application Priority Data

Jun. 9, 2010 (CN) .......................... 2010 1 0196369

(51) Int. Cl.  
*G06F 3/048* (2013.01)

(52) U.S. Cl.  
USPC ........... 715/848; 715/753; 715/758; 715/765; 715/782; 345/419; 345/592; 345/649

(58) Field of Classification Search  
USPC ......... 715/753, 757, 758, 764, 765, 781, 782, 715/799, 848, 849, 976; 345/419, 473, 592, 345/619, 649, 650, 653, 660, 661, 664, 666, 345/667  
See application file for complete search history.

(56) References Cited

U.S. PATENT DOCUMENTS

| | | | |
|---|---|---|---|
| 5,515,486 A * | 5/1996 | Amro et al. | 715/848 |
| 2003/0032479 A1 * | 2/2003 | LeMay et al. | 463/32 |
| 2003/0156146 A1 * | 8/2003 | Suomela et al. | 345/864 |
| 2005/0204306 A1 | 9/2005 | Kawahara et al. | |
| 2010/0169836 A1 * | 7/2010 | Stallings et al. | 715/848 |

FOREIGN PATENT DOCUMENTS

| | | | | |
|---|---|---|---|---|
| CN | 101424995 A | | 5/2009 | |
| GB | 2425700 A | | 11/2006 | |
| TW | 201019211 A | * | 5/2010 | ............. G06F 3/048 |

OTHER PUBLICATIONS

International Search Report for International Patent Application No. PCT/CN2011/071234, dated May 26, 2011, and English translation thereof.  
International Preliminary Report on Patentability (Chapter I of the Patent Cooperation Treaty) for PCT/CN2011/071234, (in Chinese with English Translation) issued Dec. 10, 2012; ISA/CN.

* cited by examiner

*Primary Examiner* — Xiomar L Bautista  
(74) *Attorney, Agent, or Firm* — Harness, Dickey & Pierce, P.L.C.

(57) ABSTRACT

A method and system for applying 3D switch panel in instant messaging tool. The method includes creating a window, and creating a plane model according to the window; receiving a command for triggering rotation; and rotating the plane model to drive the interface window of the instant messaging tool to rotate. The adoption of the method and the system provided can use the 3D to switch panels of the instant messaging tool, which can satisfy users' individual demands and improves the usability of the instant messaging tool.

9 Claims, 5 Drawing Sheets

METHOD AND SYSTEM FOR APPLYING 3D SWITCH PANEL IN INSTANT MESSAGING TOOL

CROSS-REFERENCE TO RELATED APPLICATIONS

This application is a continuation of United States Patent Application No. PCT/CN2011/071234 filed on Feb. 24, 2011. This application claims the benefit and priority of CN 201010196369.6, filed Jun. 9, 2010. The entire disclosures of each of the above applications are incorporated herein by reference.

FIELD

The present disclosure relates to computer technology application and to a method and system for applying 3D switch panel in an instant messaging tool.

BACKGROUND

This section provides background information related to the present disclosure which is not necessarily prior art.

Network instant messaging tools developed up until now, have been accepted by the majority of internet users, have become essential software tools of users, and have been widely used not only in the usual leisure entertainment but also in the workplace. Thus, the users put forward high requirements for usability, stability and other aspects of the instant messaging software. An interface window presented to users by the traditional instant messaging tools is a two-dimensional image, clicking corresponding buttons on the interface displays different panels to realize panel switching, for example, clicking "contact" button, then the content of a "contact" panel is displayed, clicking "recent contact" button, then the content of a "recent contact" panel is displayed. Thus, the traditional instant messaging tools cannot apply to a 3D switch panel.

In other scenes of applying 3D, such as rotation in 3D games, is to rotate one element presented in the window, and this rotation is just rotating the rotating object, rather than the window itself.

SUMMARY

This section provides a general summary of the disclosure, and is not a comprehensive disclosure of its full scope or all of its features.

Based on this, it is necessary to provide a method and system for applying 3D switch panel in an instant messaging tool, which can rotate the window of the instant messaging tool.

A method for applying 3D switch panel in an instant messaging tool includes following steps: creating a window, and creating a plane model according to the window; receiving a command for triggering rotation; and rotating the plane model to drive the interface window of the instant messaging tool contained in the created window to rotate.

A predetermined number of pixels is reserved at four sides of the created window so that a size of a remaining window of the created window after removing the reserved pixels from the created window is the same as a size of the interface window of the instant messaging tool.

Creating a plane model includes creating a Viewport3D which has the same size as the created window and covers the created window, setting transparency of the Viewport3D as 0, and creating the plane model in the Viewport3D.

Creating the plane model in the Viewport3D includes:
creating in a three-dimensional coordinate system of the Viewport3D a rectangle, of which a center coincides with an origin of the coordinate system;
calculating a scaling which enables a height of an image of the rectangle in the Viewport3D is the same as a height of the interface window of the instant messaging tool;
scaling the rectangle according to the scaling to form the plane model;
taking a screenshot of an interface presented to users by the instant messaging tool, and pasting the screenshot on a front of the plane model; and
taking a screenshot of an interface needed to be presented after the interface window of the instant messaging tool is rotated, and pasting the screenshot of the interface needed to be presented after the interface window of the instant messaging tool is rotated on a back of the plane model.

Rotating the plane model to drive the interface window of the instant messaging tool contained in the created window to rotate includes:
setting transparency of the Viewport3D as 1; and
rotating the plane model with the screenshots pasted thereon by using a method for executing a specified angle 3D rotation around a specified axis.

Rotating the plane model with the screenshots pasted thereon includes using AxisAngleRotation3D method to rotate the plane model with the screenshots pasted thereon 180 degrees.

Rotating the plane model with the screenshots pasted thereon includes setting transparency of the Viewport3D as 0 and displaying a target window after the back of the plane model with the screenshots pasted thereon forms an image.

A system for applying 3D switch panel in an instant messaging tool includes: a window creation module configured to create a window; a model creation module configured to create a plane model according to the window; a trigger configured to receive a command for triggering rotation; and a rotation module configured to, when the trigger receives the command for triggering rotation, rotate the plane model to drive the interface window of the instant messaging tool contained in the created window.

A predetermined number of pixels is reserved at four sides of the window created by the window creation module so that a size of a remaining window of the window created by the window after removing the reserved pixels from the window created by the window is the same as a size of the interface window of the instant messaging tool.

The model creation module creates a Viewport3D which has the same size as the created window and covers the created window, creates in a three-dimensional coordinate system of the Viewport3D a rectangle of which a center coincides with an origin of the coordinate system, and creates the plane model according to heights of the created rectangle and the interface window of the instant messaging tool; and the system further comprises a transparency setting module, and the transparency setting module sets transparency of the Viewport3D as 0 after the Viewport3D is created by the model creation module.

The system includes a model scaling module, which is configured to calculate a scaling which enables a height of an image of the rectangle in the Viewport3D to be the same as a height of the interface window of the instant messaging tool, and scale the rectangle according to the scaling to form the plane model;

wherein the rotation module includes a picture pasting module for taking a screenshot of an interface presented to users by the instant messaging tool and pasting the screenshot on a front of the plane model, and taking a screenshot of an interface needed to be presented after the interface window of the instant messaging tool is rotated and pasting the screenshot of the interface needed to be presented after the interface window of the instant messaging tool is rotated on a back of the plane model;

the transparency setting module sets transparency of the Viewport3D as 1 after the picture pasting module pastes the screenshots on the front and the back of the plane model; and the rotation module rotates the plane model with the screenshots pasted thereon by using a method for executing a specified angle 3D rotation around a specified axis.

The rotation module uses an AxisAngleRotation3D method to rotate the plane model with the screenshots pasted thereon 180 degrees; and the transparency setting module sets transparency of the Viewport3D as 0 after the rotation module rotate the plane model with the screenshots pasted thereon.

The above method and system for applying 3D switch panel in an instant messaging tool uses the created window and the plane model to rotate the interface window of the instant messaging tool after receiving a command for triggering rotation, thereby achieving using the 3D to switch panels of the instant messaging tool, which can satisfy users' individual demands and improves the usability of the instant messaging tool.

Further areas of applicability will become apparent from the description provided herein. The description and specific examples in this summary are intended for purposes of illustration only and are not intended to limit the scope of the present disclosure.

DRAWINGS

In order to more clearly illustrate various embodiments, the figures in the description of the embodiments will be briefly described herein. The figures in the following description are only some embodiments, are not all possible implementations, and are not intended to limit the scope of the present disclosure. It would be easy for one skilled in the art to obtain other figures based on the following figures without creative work.

Corresponding reference numerals indicate corresponding parts throughout the several views of the drawings.

DETAILED DESCRIPTION

To make the above objectives, features and advantages of the present disclosure more clear, example embodiments are hereinafter further described in detail with reference to the accompanying drawings and embodiments.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

Figure 1:
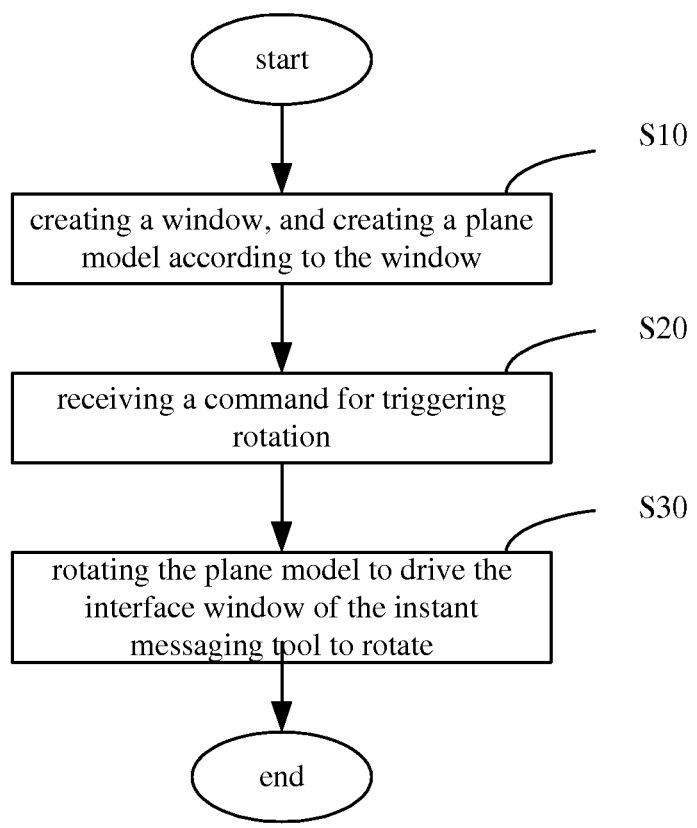
FIG. 1 is a flow chart of a method for applying 3D switch panel in an instant messaging tool of one embodiment.

As shown in FIG. 1, a method for applying 3D switch panel in an instant messaging tool includes the following:

At S10: creating a window, and creating a plane model according to the window.

Figure 2:
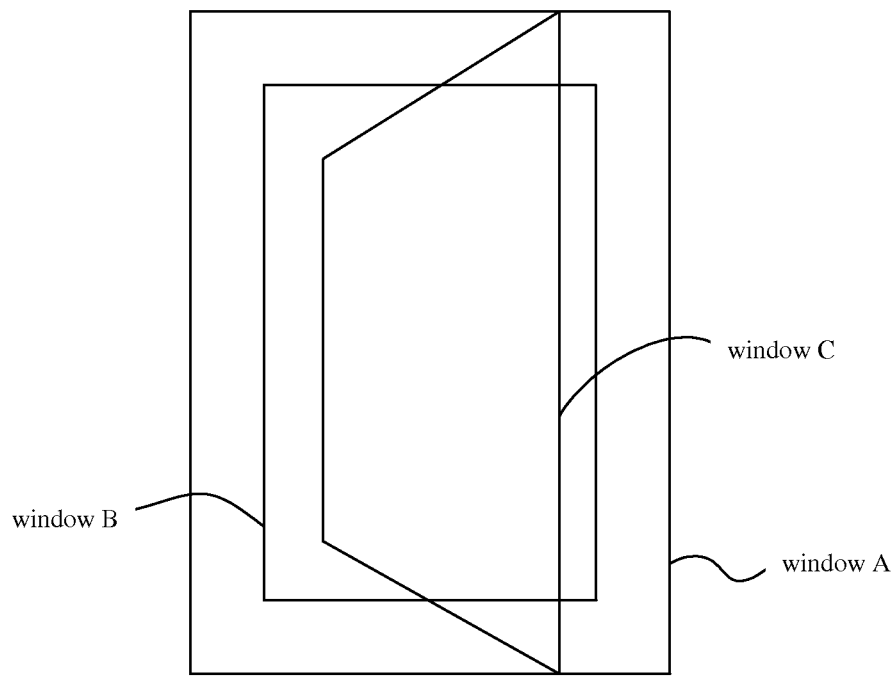
FIG. 2 is schematic diagram of creating a window of one embodiment.

As shown in FIG. 2, a window A is a created window, and predetermined number of pixels is reserved at four sides of the window A (such as 20 pixels), so that a size of a remaining window after removing the reserved pixels is the same as a size of an interface window of the instant messaging tool. A window B shown in FIG. 2 is a visible window, and its size is the same as the size of the interface window of the instant messaging tool, and displays content which can be presented. From the users' view, the content in the widow B is the interface window of the instant messaging tool. That is, the created window holds the interface window of the instant messaging tool, and the window B will be displayed as a window C after the window B is rotated.

One embodiment includes creating a Viewport3D has the same size as the window A and overlaps the window A, and setting the transparency of the Viewport3D as 0, and creating the plane model in the Viewport3D. The Viewport3D is a component which can display 3D modeling provided by WPF (Windows Presentation Foundation, Microsoft's next-generation graphics system, running on the NET Framework3.0, providing uniform descriptions and operation methods for user interface, 2D/3D graphics, documents and media).

Figure 3:
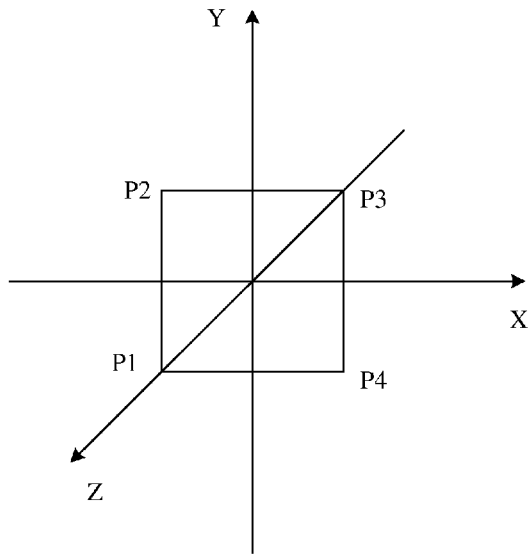
FIG. 3 is schematic diagram of creating a plane model of one embodiment.
Figure 4:
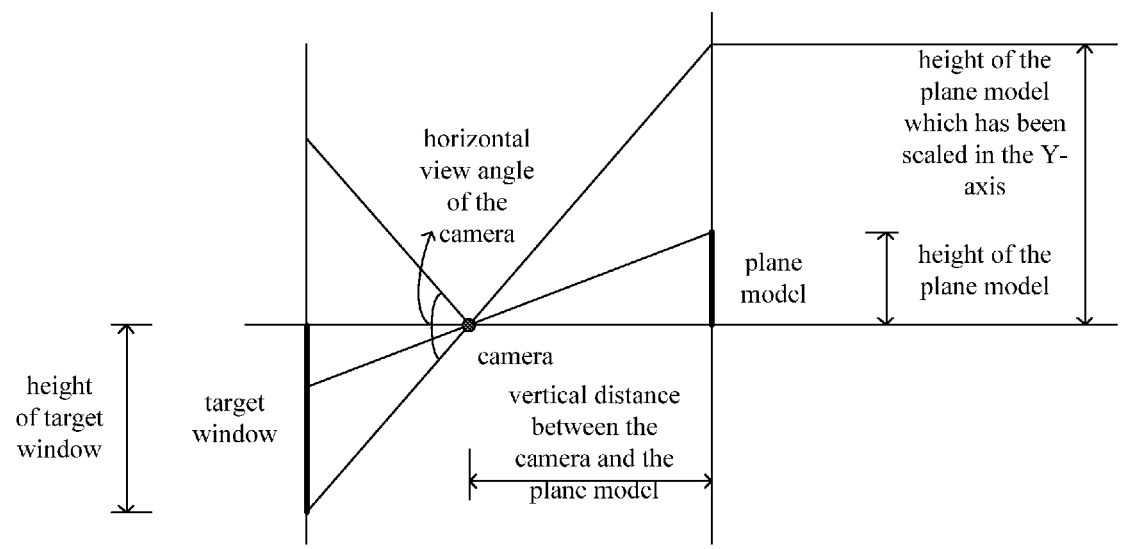
FIG. 4 is a schematic diagram showing imaging principle of a plane model of one embodiment.

In an X-axis and Y-axis plane in three-dimensional coordinate system, a rectangle is created, a center of the rectangle coincides with an origin of the coordinate system, and the created rectangle is the plane model. As shown in FIG. 3, the plane model is formed by four points P1, P2, P3 and P4 which are connected with straight lines. FIG. 4 shows imaging principle of the plane model of one embodiment. After the plane model forms an image, what is displayed in the imaging area is a target window, i.e., visible window. Since a height of the direct imaging of the plane model is different from a height of the target window, it is needed to scale the plane model, so that a height of the imaging of the plane model is the same as the height of the target window.

The calculation principle of scaling is as follows:

setting a height of the target window (i.e., visible area or visible window) as height_target, a width of the visible area as width_target, a height of the plane model as height_object, a width of the plane model as width_object, a vertical distance between a camera and the plane model as zPosition_Camera, a vertical distance from the camera to the imaging area (i.e., target window) as Position, a horizontal view angle of the camera as FieldOfView of which the unit is degree which is needed to be converted to radians during calculation. Defining a scaling of the plane model in the X-axis as ScaleXmulriple, and a scaling c as ScaleYmulriple. There are as follows:

$$(width\_object * ScaleXmulriple)/zPosition\_Camera = tg\ (FieldOfView * PI/180/2),$$

a calculation formula providing the scaling of the plane model in the X-axis according to the above formula is:

ScaleXmulriple=(zPosition_Camera*tg(FieldOfView/2))/width_object.

According to FIG. 4, there are:

Position=width_object/tg(FieldOfView*PI/180/2);

tan Y=height_target/Position;

tan Y=(height_object*ScaleYmulriple)/zPostion_Camera; and

ScaleYmulriple=((height_target*zPostion_Camera)/Position)/height_object

A calculation formula providing the scaling of the plane model in the Y-axis according to the above formula is:

ScaleYmulriple=((height_target*zPostion_Camera*tg(FieldOfView*PI/180/2))/width_object)/height_object.

Thus, after the height and width of the plane model, the horizontal view angle of the camera as well as the vertical distance between the camera and the plane model are obtained, the scaling of the plane model can be obtained through calculation according to the height of the target window. Since the actually created window (such as the window A shown in FIG. 2) reserves a predetermined number of pixels relative to the interface window (such as the window B) of the instant messaging tool, when the interface window of the instant messaging tool is presented to user's plane such as the window B, the plane model which has been scaled according to the scaling should have the same size as the remaining window of the window A after the reserved pixels are removed from the window A.

S20: receiving a command for triggering rotation.

A variety of ways can be set to trigger the rotation. For example, setting a rotation button on the panel of the instant messaging tool and clicking the rotation button to trigger rotation of the interface window of the instant messaging tool. In another example, setting using mouse to click an area of the interface window of the instant messaging tool and using the movement operation of the mouse after the left key or the right key of the mouse is pressed to trigger rotation of the interface window of the instant messaging tool.

At S30: rotating the plane model to drive the interface window of the instant messaging tool to rotate.

Figure 5:
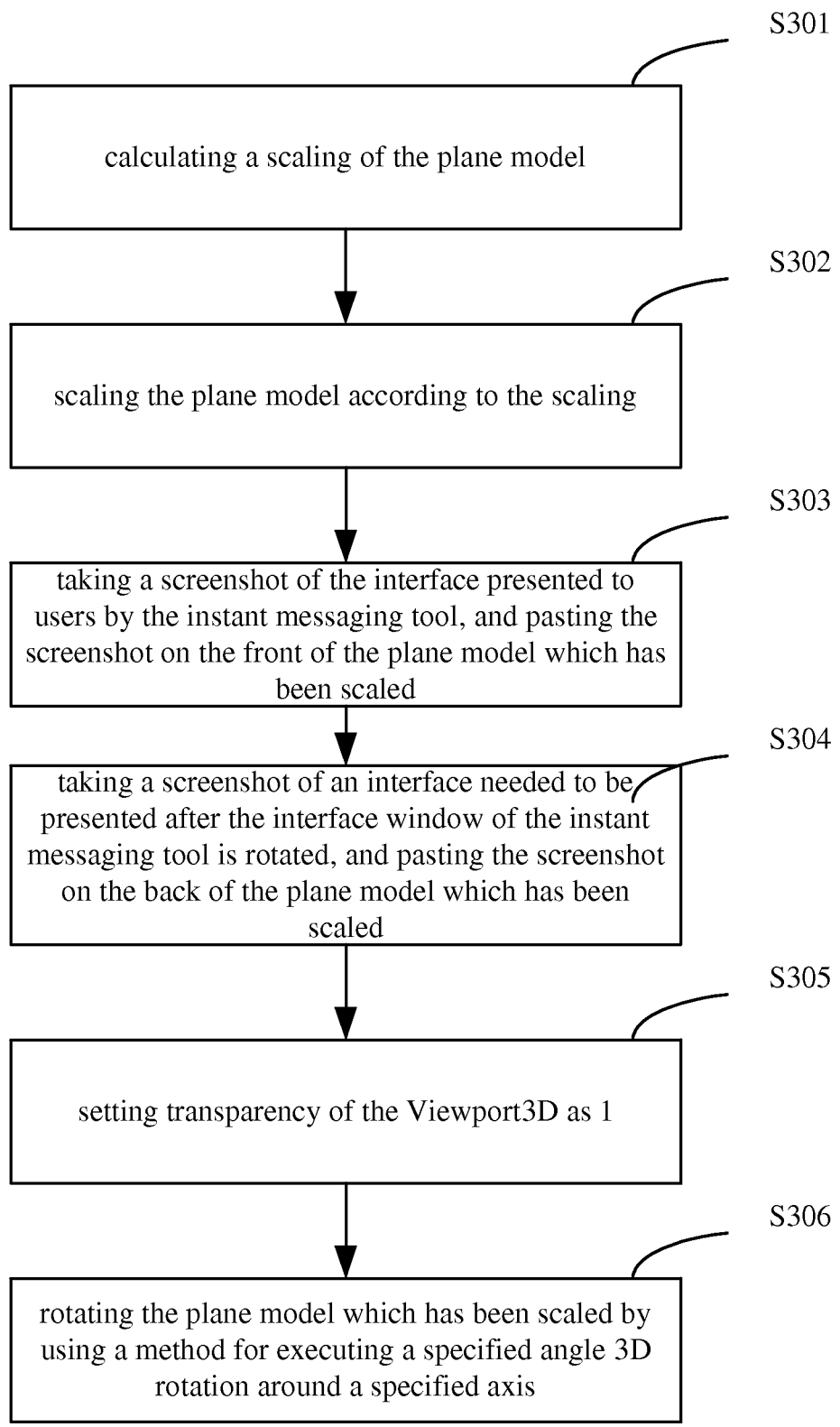
FIG. 5 is a flow chart of a method for rotating an interface window of the instant messaging tool of one embodiment.

In various embodiments, as previously mentioned, the Viewport3D which has the same size as the window that has been created, the Viewport3D covers the entire window, the transparency of the Viewport3D is set as 0, thus, the window is visible for users, and the plane model is created in the Viewport3D. In one embodiment, as shown in FIG. 5, the specific process of S30 is as follows:

At S301: calculating a scaling which enables a height of the image of the plane model in the Viewport3D is the same as a height of the interface window of the instant messaging tool. After the plane model is created, the scaling of the plane model in X-axis and the Y-axis can be obtained through calculation in accordance with the above formula according to the height and width of the flat model.

At S302: scaling the plane model according to the scaling. An image of the plane model which has been scaled has the same size as the target window (the interface window of the instant messaging tool).

At S303: taking a screenshot of the interface presented to users by the instant messaging tool, and pasting the screenshot on the front of the plane model which has been scaled.

In various embodiments, GeometryModel3D method (which provides methods for setting maps for models) is adopted to paste the screenshot on the front of the plane model which has been scaled.

At S304: taking a screenshot of an interface needed to be presented after the interface window of the instant messaging tool is rotated, and pasting the screenshot on the back of the plane model which has been scaled.

In various embodiments, GeometryModel3D method is also adopted to paste the screenshot on the back of the plane model which has been scaled.

At S305: setting transparency of the Viewport3D as 1.

In various embodiments, the transparency of the Viewport3D is 1, the Viewport3D covers the window, and thus, the interface presented to users by the instant messaging tool is hidden.

At S306: rotating the plane model which has been scaled by using a method for executing a specified angle 3D rotation around a specified axis.

In various embodiments, the AxisAngleRotation3D method (a method acts on models, to enable models to rotate according specified angles) is adopted to rotate the plane model which has been scaled. After 180 degrees rotation, setting the transparency of the Viewport3D as 0, that is, the Viewport3D is hidden, displaying a target window in which the back of the plane model which has been scaled forms an image, i.e., presenting an interface needed to be displayed after the instant messaging tool is rotated to users.

Figure 6:
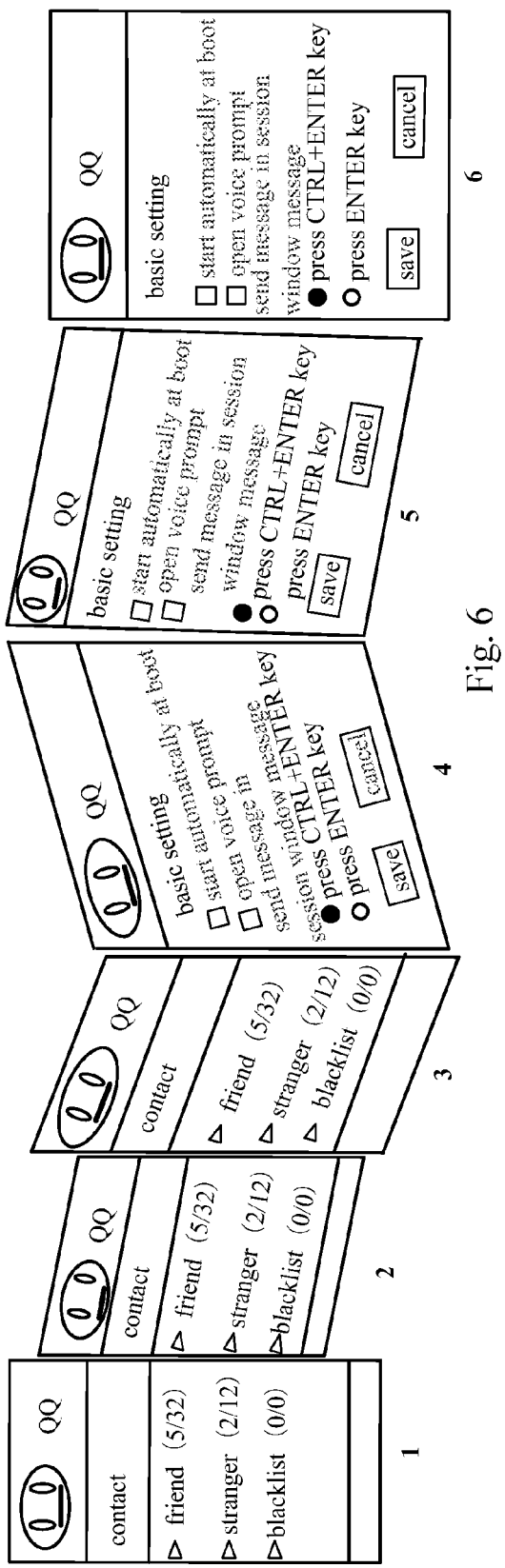
FIG. 6 is an effect diagram of applying 3D switch panel in the instant messaging tool of one embodiment.

As shown in FIG. 6, in the state 1, an interface presented to users by the instant messaging tool is "contact" panel. After triggering rotation, the interface window of the instant messaging tool is rotated, through the states 2-6, an interface finally presented to users is preset "basic setting" panel, thereby realizing using the 3D to switch panels of the instant messaging tool, which can satisfy users' individual demands and improves the usability of the instant messaging tool.

Figure 7:
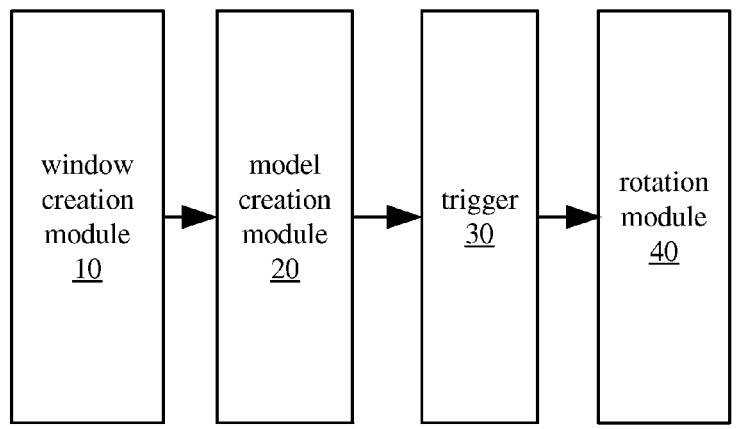
FIG. 7 is a structure schematic diagram of a system for applying 3D switch panel in an instant messaging tool of one embodiment.

As shown in FIG. 7, a system for applying 3D switch panel in an instant messaging tool includes a window creation module 10, a model creation module 20, a trigger 30 and a rotation module 40. The window creation module 10 is configured to create a window; the model creation module 20 is configured to create a plane model; the trigger 30 is configured to receive a command for triggering rotation; and the rotation module 40 is configured to, when the trigger 30 receives a command for triggering rotation, use the window and the plane model to drive the interface window of the instant messaging tool.

In various embodiments, a predetermined number of pixels is reserved at four sides of the window created by the window creation module 10, so that a size of a remaining window after removing the reserved pixels is the same as a size of the interface window of the instant messaging tool. The model creation module 20 creates a Viewport3D which has the same size as the window created by the window creation module 10 and covers the window created by the window creation module 10, and creates the plane model in the Viewport3D. As shown in FIG. 3 and FIG. 4, the plane model is created in X-axis and Y-axis plane in three-dimensional coordinate system, and a target window after the plane model forms an image in the Viewport3D is the visible window. In order to make the target window after the plane model forms an image have the same size as the interface window of the instant messaging tool, the plane model is scaled according to a certain scaling, and the scaling of the plane model can be obtained through calculation according to the above formula.

Figure 8:
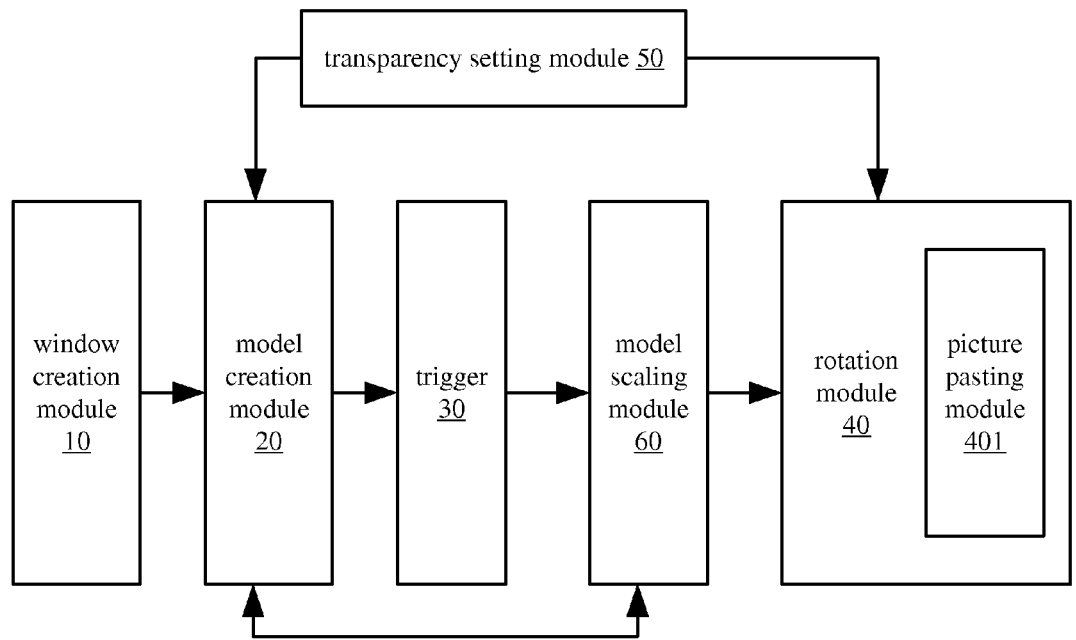
FIG. 8 is a structure schematic diagram of a system for applying 3D switch panel in an instant messaging tool of another embodiment.

In various embodiments, as shown in FIG. 8, the system further includes a transparency setting module 50 and a model scaling module 60, besides the window creation module 10, the model creation module 20, the trigger 30 and the rotation module 40. The transparency setting module 50 sets the transparency of the Viewport3D as 0, after the Viewport3D has been created by the model creation module 20, here, the Viewport3D is hidden. The model scaling module 60 is configured to calculate a scaling which enables a height of the image of the plane model in the Viewport3D is the same as a height of the interface window of the instant messaging tool, and scale the plane model according to the scaling.

In various embodiments, the rotation module 40 includes a picture pasting module 401 for taking a screenshot of the interface presented to users by the instant messaging tool and pasting the screenshot on the front of the plane model which has been scaled, and taking a screenshot of an interface needed to be presented after the interface window of the instant messaging tool is rotated and pasting the screenshot on the back of the plane model which has been scaled. After the picture pasting module 401 pastes the screenshots on the front and the back of the plane model which has been scaled, the transparency setting module 50 sets the transparency of the Viewport3D as 1, here, the window is covered by the Viewport3D. The rotation module 40 is configured to use a method for executing a specified angle 3D rotation around a specified axis to rotate the plane model which has been scaled, specifically, the AxisAngleRotation3D method (a method acts on models, to enable models to rotate according specified angles) is used to rotate the plane model which has been scaled; after 180 degrees rotation, setting the transparency of the Viewport3D as 0. That is, the Viewport3D is hidden, displaying a target window after the back of the plane model which has been scaled forms an image, i.e., presenting an interface needed to be displayed after the instant messaging tool is rotated to users.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for applying 3D switch panel in an instant messaging tool, comprising following steps:
    creating a window and creating a plane model according to the window;
    receiving a command for triggering rotation; and
    rotating the plane model to drive an interface window of the instant messaging tool contained in the created window to rotate;
    wherein the step of creating a plane model comprises creating a Viewport3D which has the same size as the created window and covers the created window, setting transparency of the Viewport3D as 0, and creating the plane model in the Viewport3D;
    wherein the step of creating the plane model in the Viewport3D comprises:
    creating in a three-dimensional coordinate system of the Viewport3D a rectangle, of which a center coincides with an origin of the coordinate system;
    calculating a scaling which enables a height of an image of the rectangle in the Viewport3D is the same as a height of the interface window of the instant messaging tool;
    scaling the rectangle according to the scaling to form the plane model;
    taking a screenshot of an interface presented to users by the instant messaging tool, and pasting the screenshot on a front of the plane model; and
    taking a screenshot of an interface needed to be presented after the interface window of the instant messaging tool is rotated, and pasting the screenshot of the interface needed to be presented after the interface window of the instant messaging tool is rotated on a back of the plane model.

2. The method of claim 1, wherein a predetermined number of pixels is reserved at four sides of the created window so that a size of a remaining window of the created window after removing the reserved pixels from the created window is the same as a size of the interface window of the instant messaging tool.

3. The method of claim 1, wherein the step of rotating the plane model to drive an interface window of the instant messaging tool contained in the created window to rotate comprises:
    setting transparency of the Viewport3D as 1;
    rotating the plane model with the screenshots pasted thereon by using a method for executing a specified angle 3D rotation around a specified axis.

4. The method of claim 3, wherein the step of rotating the plane model with the screenshots pasted thereon comprises using AxisAngleRotation3D method to rotate the plane model with the screenshots pasted thereon 180 degrees.

5. The method of claim 4, further comprising setting transparency of the Viewport3D as 0 and displaying a target window after the back of the plane model with the screenshots pasted thereon forms an image, after the step of rotating the plane model with the screenshots pasted thereon.

6. A computer-implemented system for applying 3D switch panel in an instant messaging tool, wherein the computer-implemented system comprises one or more processors coupled to a memory storing instructions, for executing by the one or more processors, configured to
    create a window;
    create a plane model according to the window;
    receive a command for triggering rotation; and
    when receiving the command for triggering rotation, rotate the plane model to drive an interface window of the instant messaging tool contained in the created window;
    wherein the one or more processors are further configured to create a Viewport3D which has the same size as the created window and cover the created window, create in a three-dimensional coordinate system of the Viewport3D a rectangle of which a center coincides with an origin of the coordinate system, and create the plane model according to heights of the created rectangle and the interface window of the instant messaging tool;
    wherein the one or more processors are further configured to set transparency of the Viewport3D as 0 after the Viewport3D is created by the model creation module.

7. The computer-implemented system of claim 6, wherein the one or more processors are further configured to reserve a predetermined number of pixels at four sides of the created window so that a size of a remaining window of the created window after removing the reserved pixels from the created window is the same as a size of the interface window of the instant messaging tool.

8. The computer-implemented system of claim 6, wherein the one or more processors are further configured to calculate a scaling which enables a height of an image of the rectangle in the Viewport3D to be the same as a height of the interface window of the instant messaging tool, and scale the rectangle according to the scaling to form the plane model;
- wherein the one or more processors are further configured to take a screenshot of an interface presented to users by the instant messaging tool and paste the screenshot on a front of the plane model, and take a screenshot of an interface needed to be presented after the interface window of the instant messaging tool is rotated and paste the screenshot of the interface needed to be presented after the interface window of the instant messaging tool is rotated on a back of the plane model;
- the one or more processors are further configured to set transparency of the Viewport3D as 1 after the screenshots are pasted on the front and the back of the plane model;
- the one or more processors are further configured to rotate the plane model with the screenshots pasted thereon by using a method for executing a specified angle 3D rotation around a specified axis.

9. The computer-implemented system of claim 8, wherein the one or more processors are further configured to use an AxisAngleRotation3D method to rotate the plane model with the screenshots pasted thereon 180 degrees; and
- the one or more processors are further configured to set transparency of the Viewport3D as 0 after the plane model is rotated with the screenshots pasted thereon.

* * * * *